United States Patent
Leong et al.

(10) Patent No.: US 8,499,644 B2
(45) Date of Patent: Aug. 6, 2013

(54) VEHICLE COLLISION STRESS WAVE SENSOR

(75) Inventors: Daniel Leong, Singapore (SG); Chee Keng Yeo, Singapore (SG); Yew Kwang Low, Singapore (SG); Kok Wee Yeo, Singapore (SG)

(73) Assignee: Delphi Technologies, Inc., Troy, MI (US)

( * ) Notice: Subject to any disclaimer, the term of this patent is extended or adjusted under 35 U.S.C. 154(b) by 200 days.

(21) Appl. No.: 13/191,527

(22) Filed: Jul. 27, 2011

(65) Prior Publication Data

US 2011/0277551 A1    Nov. 17, 2011

Related U.S. Application Data (63) Continuation-in-part of application No. 12/484,547, filed on Jun. 15, 2009, now Pat. No. 8,011,253.

(51) Int. Cl.
*G01L 1/00* (2006.01)
*G01B 7/16* (2006.01)

(52) U.S. Cl.
USPC ............................... 73/767; 73/12.01; 73/760

(58) Field of Classification Search
USPC ................................................ 73/767, 12.01
See application file for complete search history.

(56) References Cited

U.S. PATENT DOCUMENTS

| | | | | |
|---|---|---|---|---|
| 3,577,779 | A * | 5/1971 | Laimins | 73/862.633 |
| 3,825,343 | A * | 7/1974 | Moore | 356/636 |
| 4,574,640 | A * | 3/1986 | Krechmery | 73/721 |
| 5,086,651 | A * | 2/1992 | Westermo et al. | 73/763 |
| 5,392,024 | A * | 2/1995 | Kiuchi et al. | 340/436 |
| 6,715,337 | B2 * | 4/2004 | Huang et al. | 73/12.12 |
| 7,231,803 | B2 * | 6/2007 | Stuetzler | 73/12.01 |
| 7,252,307 | B2 * | 8/2007 | Kanbe et al. | 280/801.1 |
| 7,398,698 | B2 | 7/2008 | Griess et al. | |
| 2001/0054317 | A1 * | 12/2001 | Arms | 73/786 |
| 2002/0023499 | A1 | 2/2002 | Boehler et al. | |
| 2002/0063630 | A1 * | 5/2002 | Curtis et al. | 340/667 |
| 2010/0313663 | A1 | 12/2010 | Leong et al. | |

* cited by examiner

*Primary Examiner* — Lisa Caputo
*Assistant Examiner* — Jamel Williams
(74) *Attorney, Agent, or Firm* — Thomas N. Twomey (57) ABSTRACT

A sensor configured to detect a stress wave propagating through a vehicle frame member caused by a vehicle collision is provided. The sensor includes a sensor body configured to be rigidly coupled to the vehicle frame member, a first strain sensing device and a second strain sensing device attached to the sensor body. The sensor body is configured to exhibit stress in response to transverse and torsional stress wave propagating along the vehicle frame member. The first strain sensing device generates a first signal indicative of stress in the sensor body and the second strain sensing device generates a second signal indicative of stress in the sensor body. A first end portion of the sensor body is characterized as trapezoidal prism shaped and a second end portion of the sensor body is characterized as trapezoidal prism shaped.

10 Claims, 11 Drawing Sheets

VEHICLE COLLISION STRESS WAVE SENSOR

CROSS-REFERENCE TO RELATED APPLICATION

This application is a continuation-in-part application and claims the benefit under 35 U.S.C. §120 of U.S. patent application Ser. No. 12/484,547, filed Jun. 15, 2009, the entire disclosure of which is hereby incorporated herein by reference.

TECHNICAL FIELD OF INVENTION

The invention generally relates to a sensor configured to detect a stress wave propagating through a vehicle frame member, and more particularly relates to a sensor configured to detect stress waves caused by a vehicle collision.

BACKGROUND OF INVENTION

Acceleration based sensors have been utilized to detect a vehicle collision with an object. However, acceleration based sensors typically are sensitive to detecting collisions along a single axis, therefore at least two acceleration sensors are required to reliably detect a vehicle collision in frontal or side impacts. Also, the response time of the acceleration based sensor may be impacted by the mechanical impedance caused by the mass of the acceleration based sensor. Pressure based sensors have also been used for vehicle collision detection. Pressure based sensors detect the change of pressure in a fluid filled bladder or tube due to a collision impact deforming the bladder or tube. Pressure based sensors may offer faster response time and more omnidirectional sensitivity than acceleration based sensors. The inventors herein have recognized that a single sensor capable of detecting collisions along multiple axes with an even faster response time would be desirable.

SUMMARY OF THE INVENTION

In accordance with one embodiment of this invention, a stress wave sensor configured to detect a stress wave propagating through a vehicle frame member is provided. The stress wave sensor includes a sensor body configured to be rigidly coupled to the vehicle frame member at a first contact surface and a second contact surface separated from the first contact surface. The stress wave sensor further includes a first strain sensing device attached to the sensor body at a first location on the sensor body in a manner effective to detect stress in the sensor body at the first location. The stress wave sensor additionally includes a second strain sensing device attached to the sensor body at a second location on the sensor body in a manner effective to detect stress in the sensor body at the second location. The second location is distinct from the first location. The sensor body is configured to exhibit stress at the first location and at the second location in response to the stress wave propagating through the vehicle frame member. The first strain sensing device generates a first signal indicative of stress in the sensor body at the first location and the second strain sensing device generates a second signal indicative of stress in the sensor body at the second location. The first contact surface is defined by a first end portion of the sensor body. The first end portion is characterized as trapezoidal prism shaped. The first end portion further defines a first non-parallel surface characterized as not parallel to the first contact surface. The second contact surface is defined by a second end portion of the sensor body. The second end portion is characterized as trapezoidal prism shaped. The second end portion further defines a second non-parallel surface characterized as not parallel to the second contact surface.

In another embodiment of the present invention, the sensor body may further define a third portion of the sensor body disposed between the first non-parallel surface and the second non-parallel surface and characterized as an elastic beam. The third portion is arcuate-shaped.

In another embodiment of the present invention, the sensor may further include a housing configured to be rigidly coupled to the vehicle frame member. The housing defines a cavity therein, and the sensor body may be disposed within the cavity. The sensor body may be rigidly coupled to the housing.

In accordance with another embodiment of this invention, a stress wave sensor is provided. The stress wave sensor includes a first end portion. The first end portion is characterized as trapezoidal prism shaped. The first end portion further defines a first non-parallel surface. The stress wave sensor further includes a second end portion. The second end portion is characterized as trapezoidal prism shaped. The second end portion further defines a second non-parallel surface. The stress wave sensor additionally includes a third portion coupled between the first non-parallel surface of the first end portion and the second non-parallel surface of the second end portion. The third portion is an arcuate-shaped plate member. The third portion has a third thickness that is less than a first thickness of the first end portion and is less than a second thickness of the second end portion, such that the third portion deflects when subjected to or receiving a stress wave. The stress wave sensor further includes a first strain sensing device and a second strain sensing device both coupled to both the first end portion and the third portion. The first strain sensing device and the second strain sensing device generate a first signal and a second signal, respectively, in response to the first strain sensing device and the second strain sensing device detecting a deflection of the third portion due to stress waves propagating through the third portion.

DETAILED DESCRIPTION OF INVENTION

A sensor that has a faster response time than acceleration based sensors or pressure based sensors may be desired for detecting a vehicle collision event. Faster response time is particularly desirable for side impact sensors due to the proximity of the vehicle occupants to the impact zone. While not subscribing to any particular theory, it has been observed that when a vehicle collides with an object, stress waves generated at the point of impact propagate through the vehicle body travelling along the solid parts of the vehicle e.g. the vehicle frame members. A stress wave sensor may be configured to detect the deflection of a vehicle frame member caused by the stress wave propagation. In contrast, an acceleration based sensor measures the rate of displacement of the sensor in space, as a result of the crash. The mechanical impendence due to the mass of the acceleration based sensor may negatively affect response time to detecting a collision. Stress wave sensors may respond more quickly than pressure based sensors for detecting collision events due to the denser medium the stress wave travels in, i.e. solid rather than fluid or gaseous. The stress wave sensor presented herein utilizes the stress wave generated by a vehicle collision for fast collision event detection.

Figure 1:
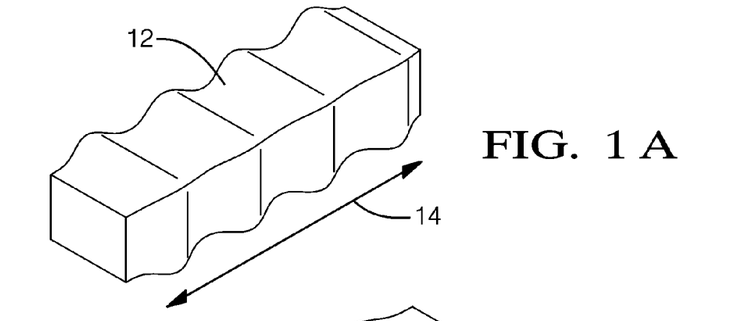
FIG. 1a is a diagram of a vehicle frame member showing the direction of propagation of a longitudinal component of a stress wave.
FIGS. 1b and 1c are diagrams of the vehicle frame member showing the direction of propagation of a transverse component of the stress wave.
FIG. 1d is a diagram of the vehicle frame member showing the direction of propagation of a torsional component of the stress wave.

Referring to FIG. 1, a stress wave propagating through a vehicle frame member 12 may have three different components, a longitudinal stress wave component 14 that causes deflection in a direction of the stress wave propagation, a transverse stress wave component 16, 17 that causes deflection in a direction normal to the stress wave propagation, and a torsional stress wave component 18 that causes torsional deflection about the direction of the stress wave propagation. The longitudinal stress wave component 14 is typically lower in amplitude than the transverse stress wave component 16a, b, 17a,b or torsional stress wave component 18a,b. The stress wave sensor 20 is therefore configured to be most sensitive to detect the transverse and torsional stress waves.

The stress wave sensor 20 may be mounted on a vehicle frame member 12 that will likely experience a greater amount of deflection due to stress wave propagation. It has been observed that the B-pillar in some vehicles may be a suitable location. It may be possible to mount a plurality of stress wave sensors at several different locations on the vehicle to measure a difference of stress wave intensity and a difference of time of arrival of the stress wave to each of the stress wave sensors to determine the location (e.g. front, side, rear), of the impact.

Figure 2:
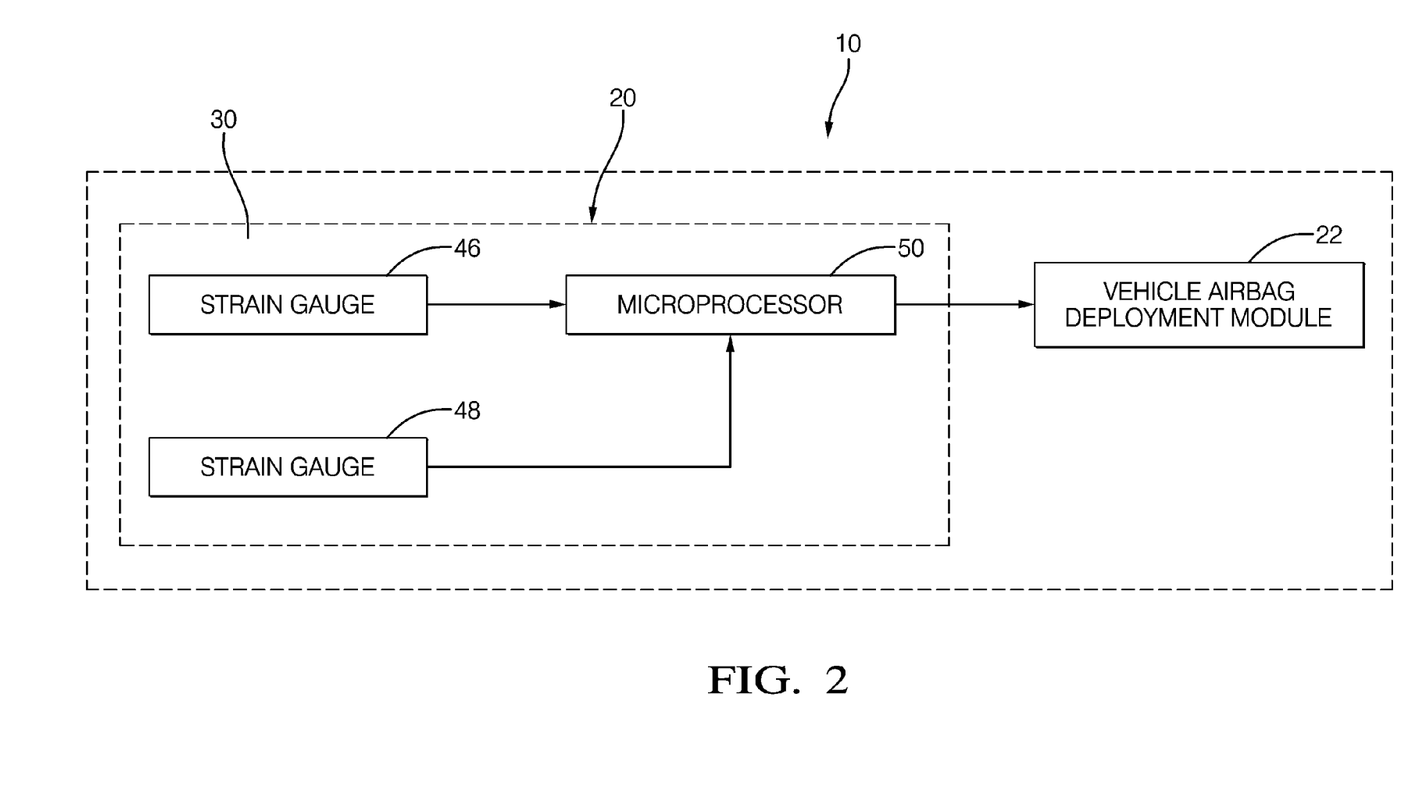
FIG. 2 is a block diagram of a vehicle having a stress wave sensor and a vehicle airbag deployment module, in accordance with an embodiment.

Referring to FIGS. 1 and 2, a stress wave sensor 20 is configured to detect a stress wave propagating through a vehicle frame member 12. The stress wave may be characterized as having a longitudinal stress wave component 14, a transverse stress wave component 16a,b, 17a,b and a torsional stress wave component 18a,b. The stress wave sensor 20 can advantageously detect a transverse stress wave component 16a,b, 17a,b or a torsional stress wave component 18a,b propagating through a vehicle frame member 12 generated by a vehicle collision event and quickly generate a signal to induce the vehicle airbag deployment module 22 to inflate a vehicle airbag. In one embodiment, the stress wave sensor 20 may have a response time of 3 to 4 milliseconds.

Figure 3:
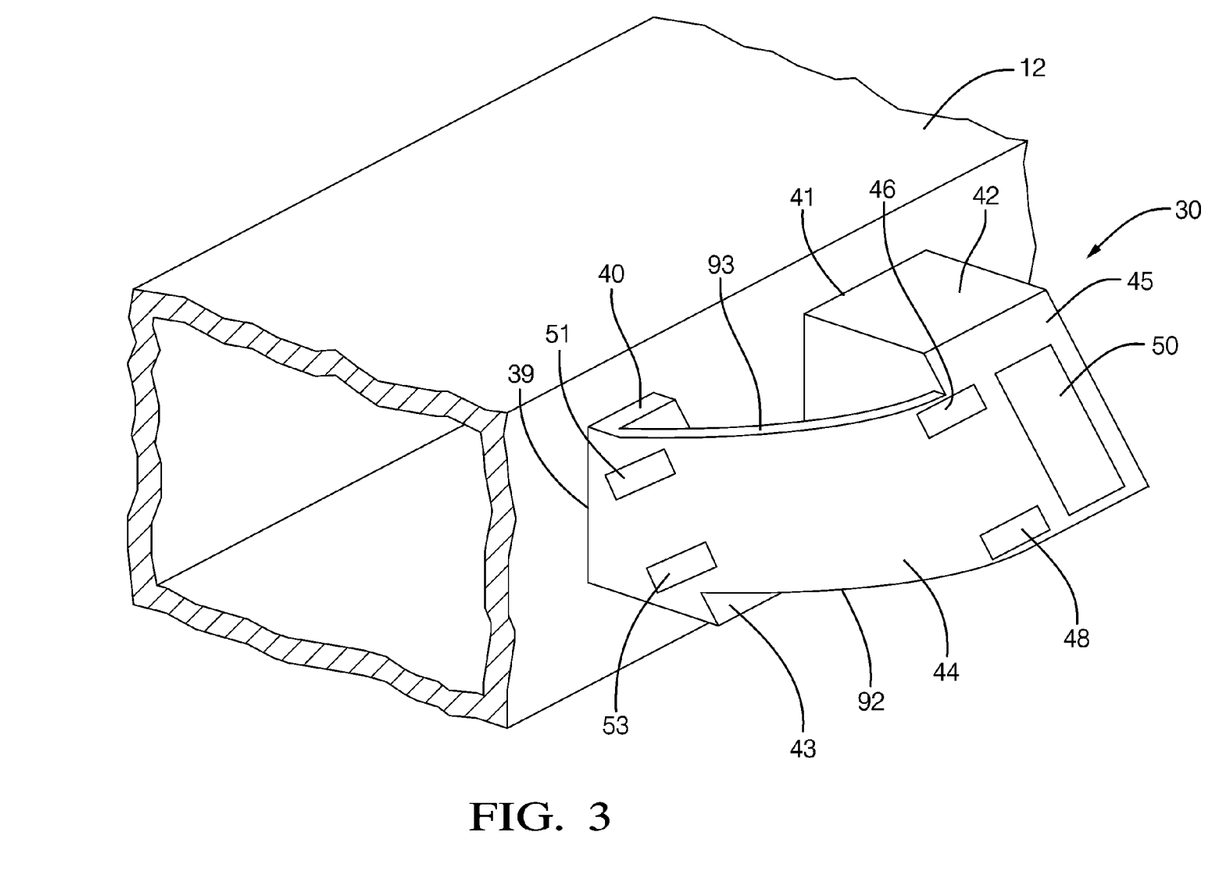
FIG. 3 is a schematic diagram of the stress wave sensor of FIG. 2.
Figure 4:
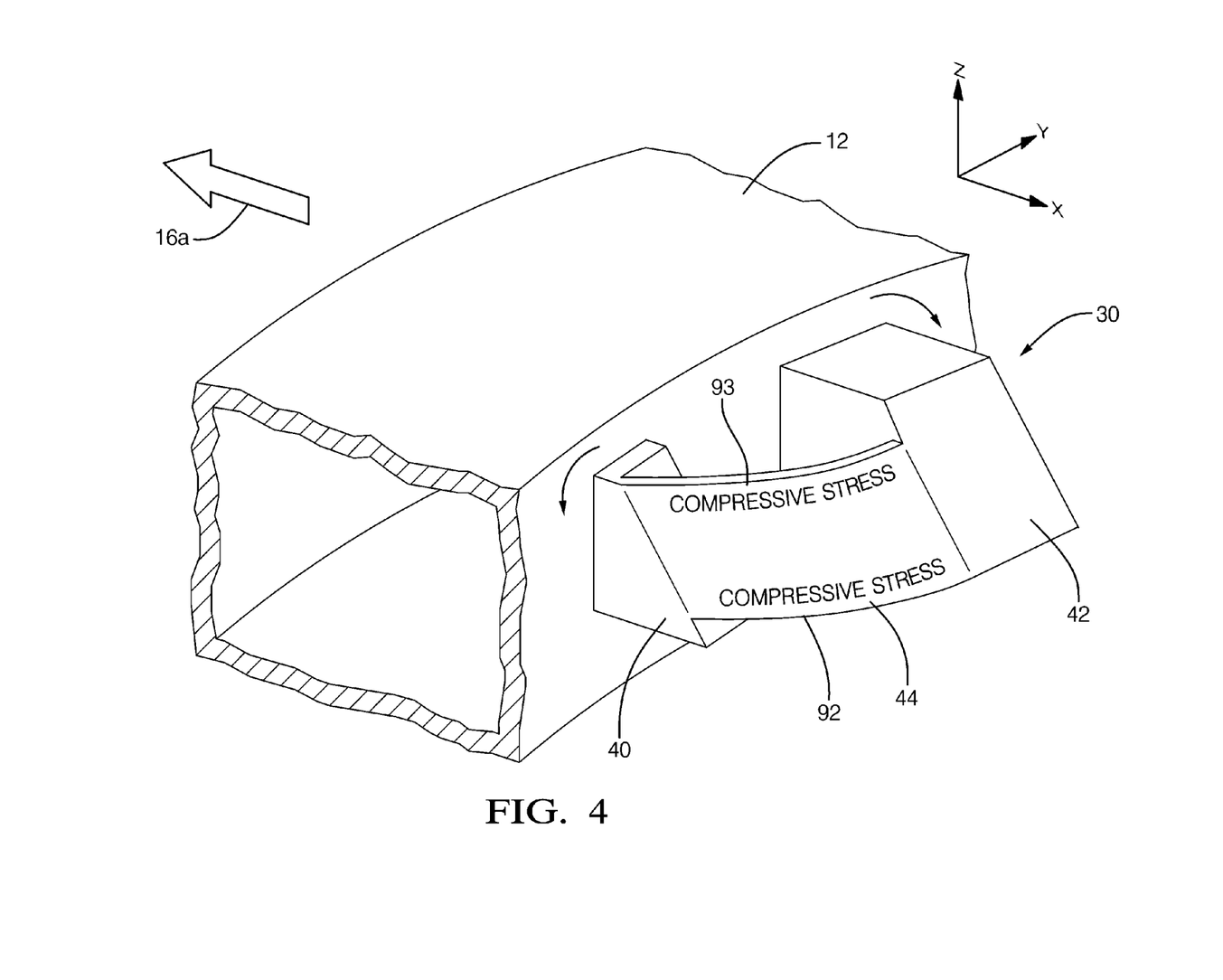
FIG. 4 is a schematic diagram of the stress wave sensor of FIG. 3 undergoing deflection due to a transverse stress wave.
Figure 5:
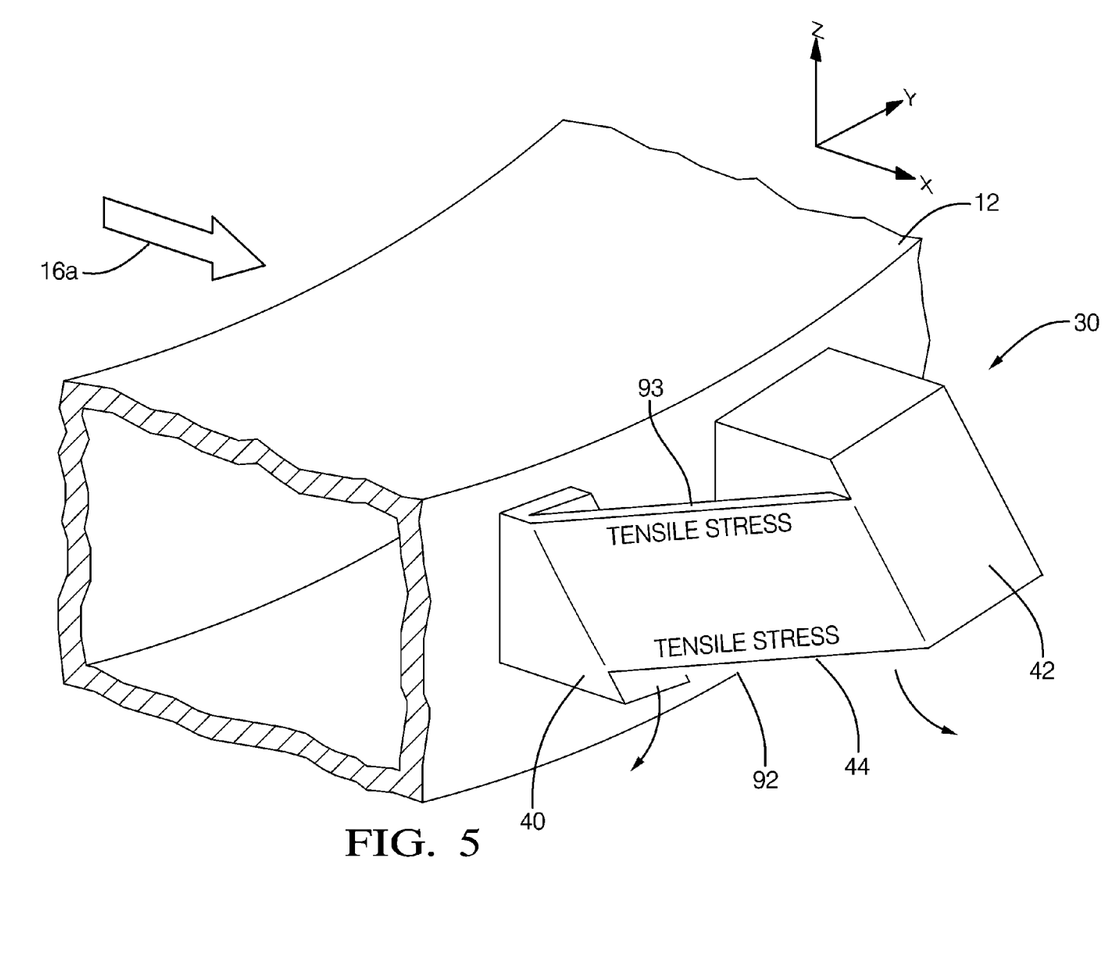
FIG. 5 is a schematic diagram of the stress wave sensor of FIG. 3 undergoing deflection in a direction opposite to the deflection of FIG. 4 due to a transverse stress wave.
Figure 6:
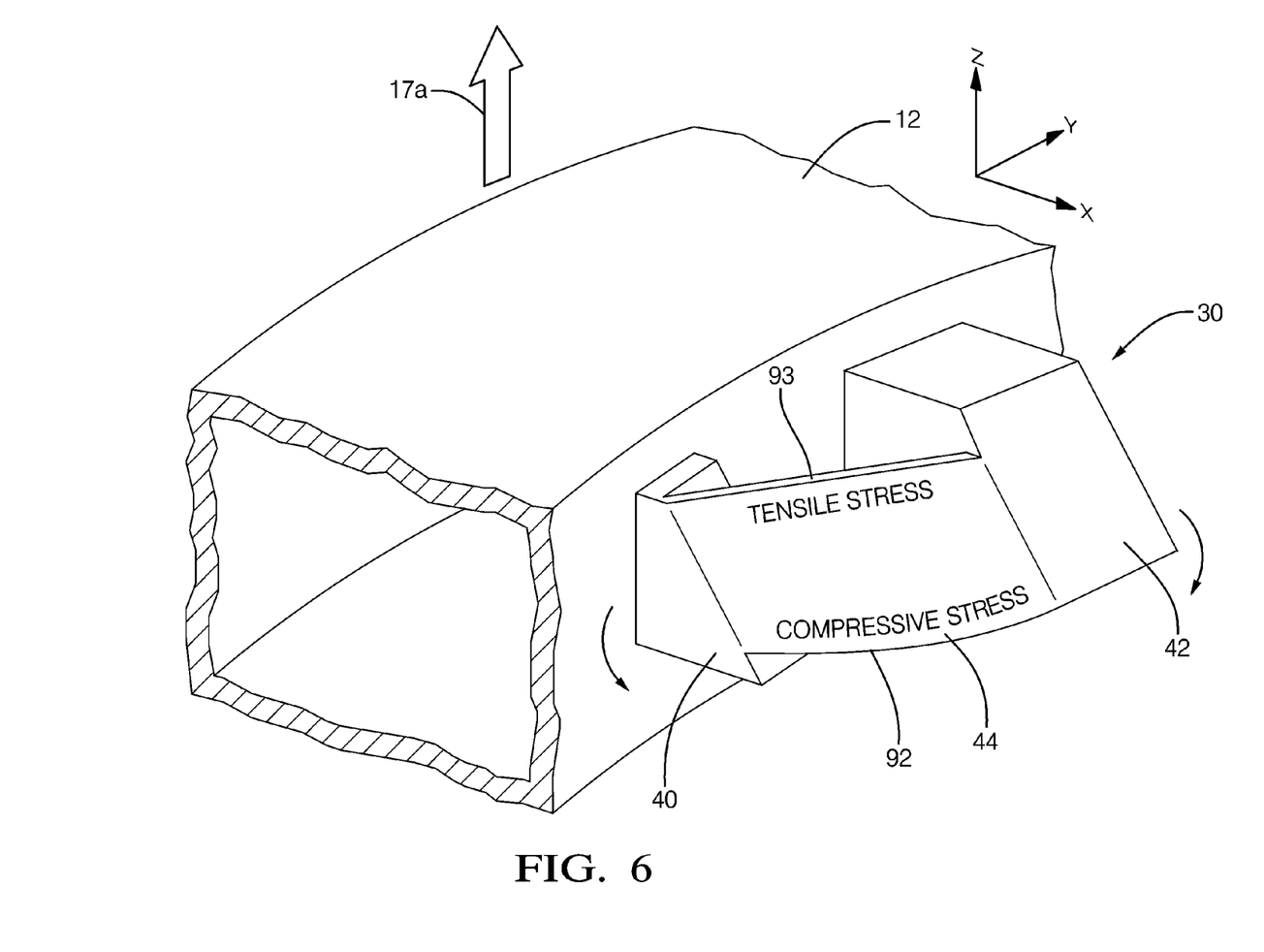
FIG. 6 is a schematic diagram of the stress wave sensor of FIG. 3 undergoing deflection in a direction orthogonal to the deflection of FIG. 4 due to a transverse stress wave.
Figure 7:
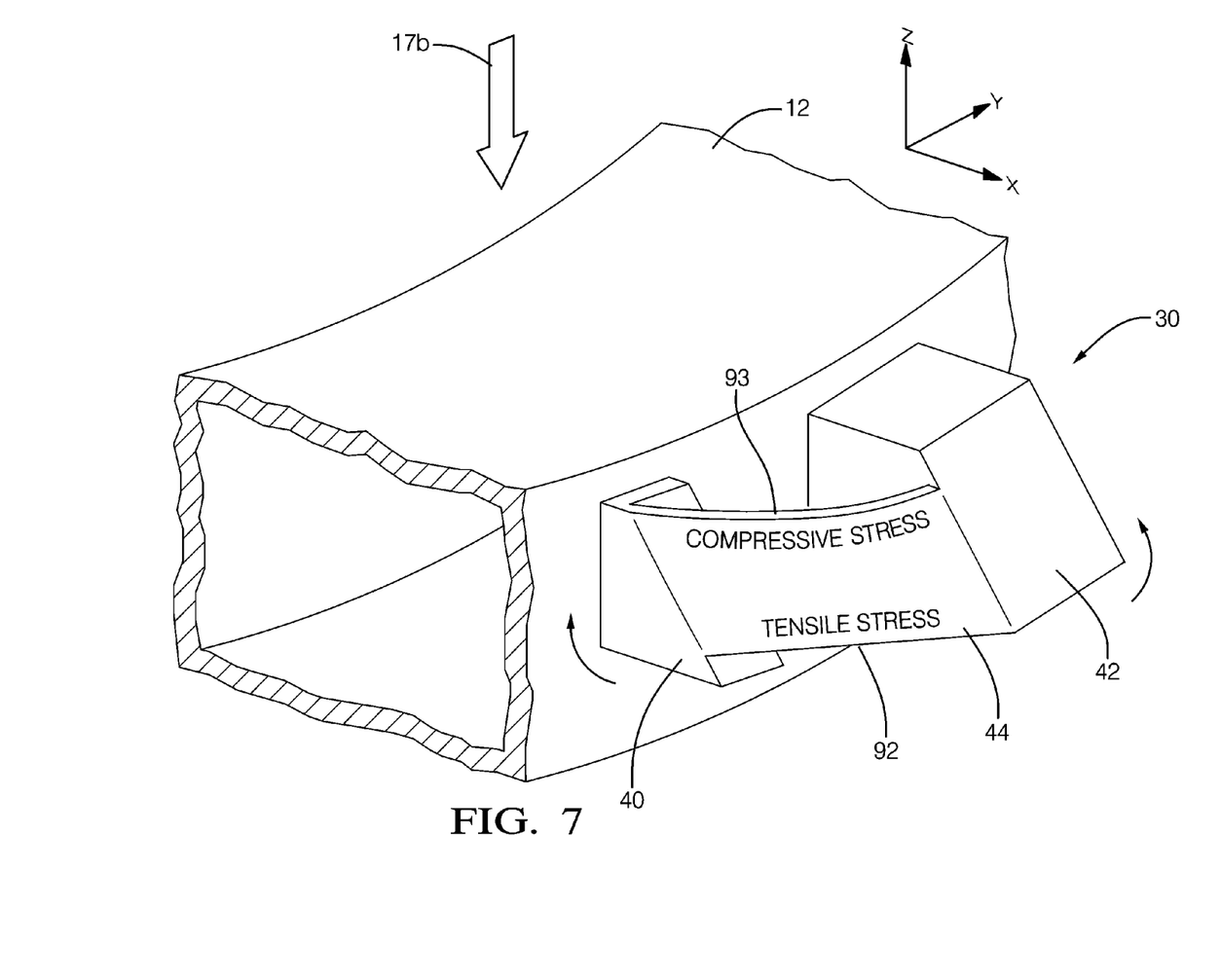
FIG. 7 is a schematic diagram of the stress wave sensor of FIG. 3 undergoing deflection in a direction opposite to the deflection of FIG. 6 due to a transverse stress wave.
Figure 8:
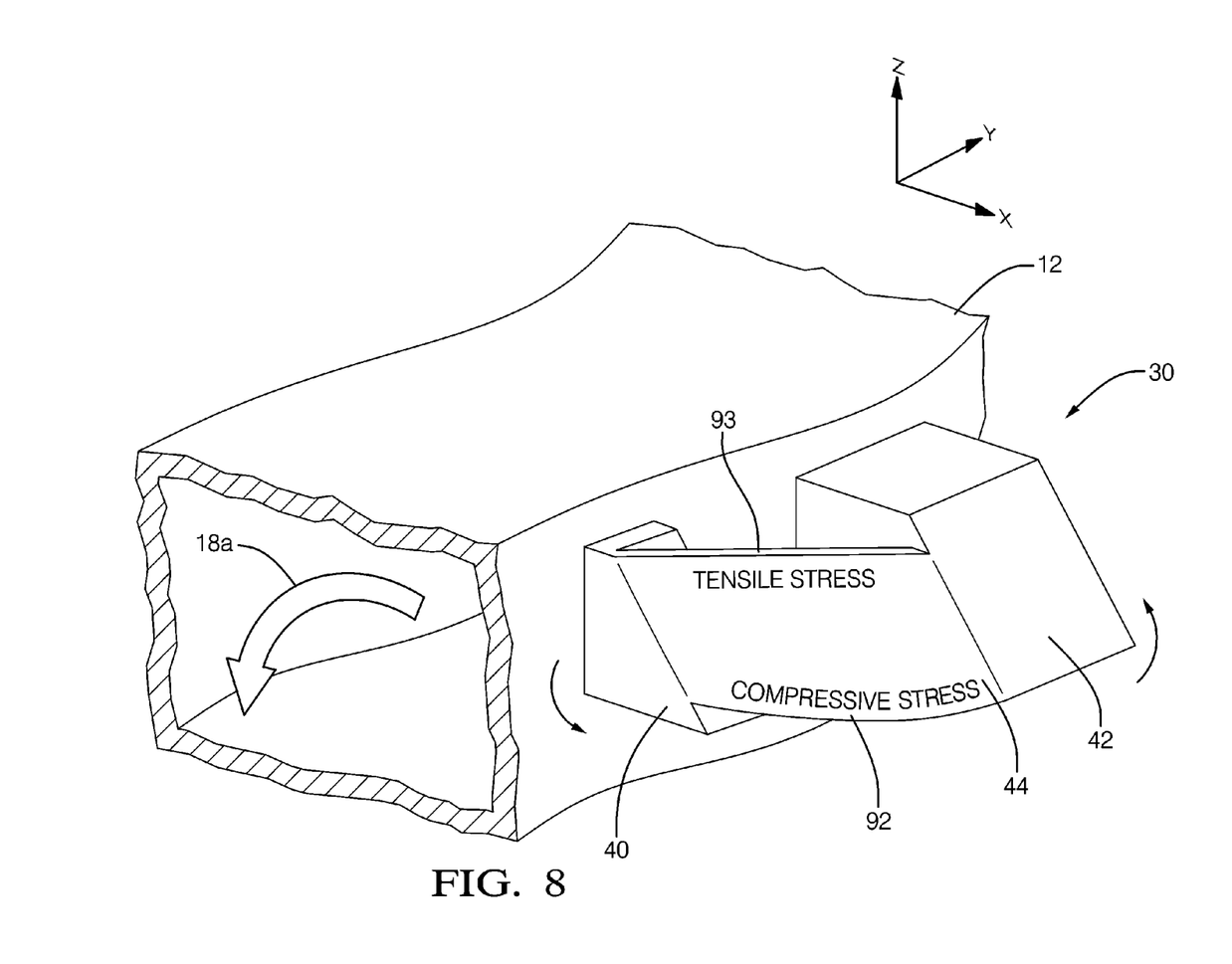
FIG. 8 is a schematic diagram of the stress wave sensor of FIG. 3 undergoing deflection due to a torsional stress wave.
Figure 9:
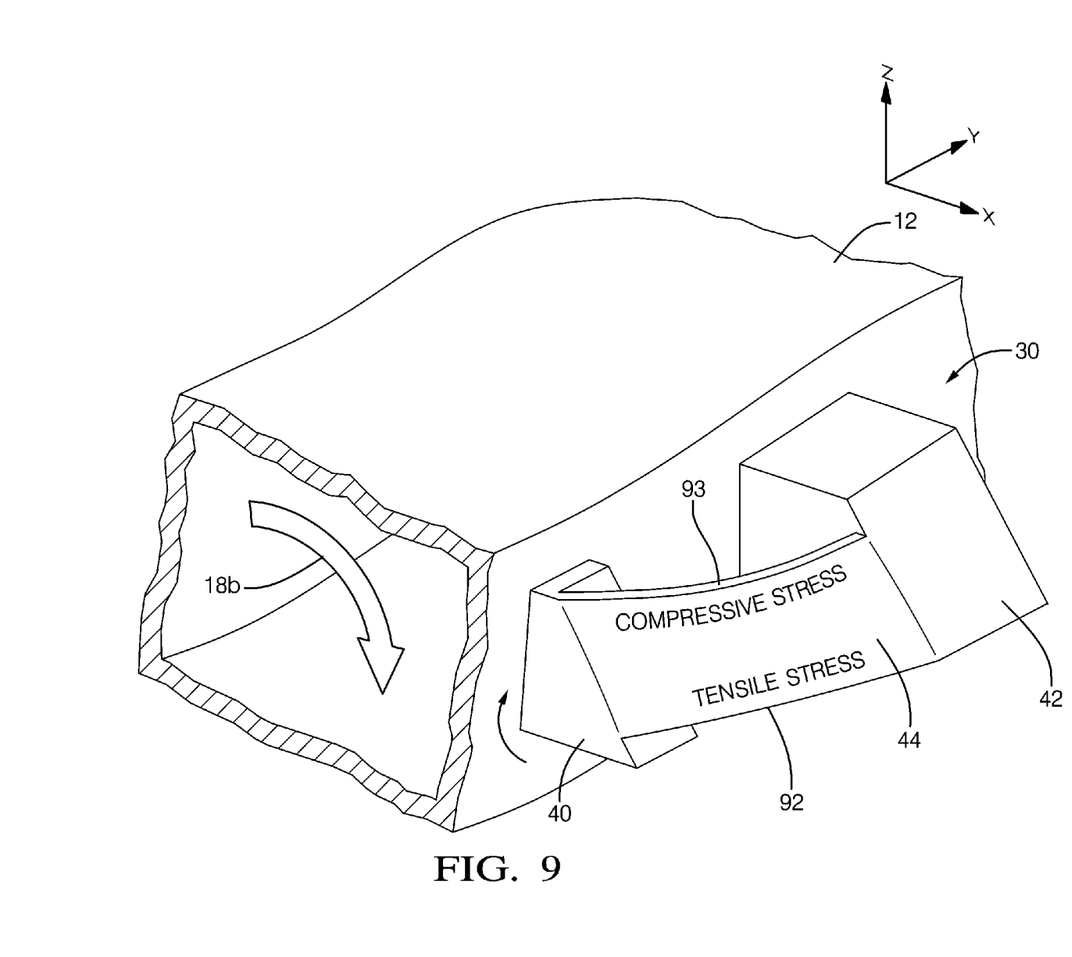
FIG. 9 is a schematic diagram of the stress wave sensor of FIG. 3 undergoing deflection in a direction opposite to the deflection of FIG. 8 due to a torsional stress wave.

Referring now to FIG. 3, the stress wave sensor 20 includes a sensor body 30 having a first contact surface 39 and a second contact surface 41 separated from the first contact surface 39. The first contact surface 39 and the second contact surface 41 are configured to be rigidly coupled to the vehicle frame member 12. A first strain sensing device 46 is attached to the sensor body 30 at a first location on the sensor body 30 in a manner effective to detect stress in the sensor body 30 at the first location. A second strain sensing device 48 is attached to the sensor body 30 at a second location on the sensor body 30 in a manner effective to detect stress in the sensor body 30 at the second location. The second location on the sensor body 30 is distinct from the first location on the sensor body 30.

Referring now to FIGS. 4 through 9, the sensor body 30 is configured to exhibit compressive or tensile stress at the first location and is further configured to exhibit compressive or tensile stress at the second location in response to the stress wave propagating along the vehicle frame member 12. The first strain sensing device 46 generates a first signal indicative of stress in the sensor body 30 at the first location and the second strain sensing device 48 generates a second signal indicative of stress in the sensor body 30 at the second location.

Additionally, a third strain sensing device 51 and a fourth strain sensing device 53 may be coupled to both the first end portion 40 and the third portion 44. The third strain sensing device 51 and the fourth strain sensing device 53 may each generate a unique signal or may be electrically coupled to the first strain sensing device 46 or the second strain sensing device 48 in a manner to improve stress sensitivity of the first signal and the second signal.

The first end portion 40 and second end portion 42 of the sensor body 30 are configured move in relationship to each other due to displacement of the vehicle frame member 12 in reaction to the stress wave propagating through the vehicle frame member 12. The relative motion of the first end portion 40 and the second end portion 42 causes stress in the sensor body 30 at the first location and the second location. The third portion 44 of the sensor body 30 may be configured to be flexible, so that stress will be concentrated in the third portion 44. The sensor body 30 may be advantageously configured so that the regions of maximum stress are concentrated at the first location and the second location.

Referring again to FIG. 3, in a non-limiting example, the first strain sensing device 46 and the second strain sensing device 48 may be four resistive strain gauges in a full Wheatstone bridge circuit or two resistive strain gauges in a half Wheatstone bridge circuit. These circuit configurations are generally self-compensating for temperature changes. Other strain sensing devices, such as capacitive, inductive, or fiber optic laser strain sensing devices may alternately be used.

The first contact surface 39 is defined by a first end portion 40 of the sensor body 30 that is characterized as a trapezoidal prism shape. The first end portion 40 may further define a first non-parallel surface 43 characterized as not parallel to the first contact surface 39. The second contact surface 41 is defined by a second end portion 42 of the sensor body 30 that is characterized as a trapezoidal prism shape. The second end portion 42 further define a second non-parallel surface 45 that is characterized as not parallel to the second contact surface 41. Further, the second end portion 42 may have a mass greater than a mass of the first end portion 40. The first non-parallel surface 43 and the second non-parallel surface 45 may be noncoplanar.

The first non-parallel surface 43 may be opposite the first contact surface 39 and the second non-parallel surface 45 may be opposite the second contact surface 41. In this case, the first end portion 40 and the second end portion 42 may be characterized as a right trapezoidal prism shape.

Figure 10:
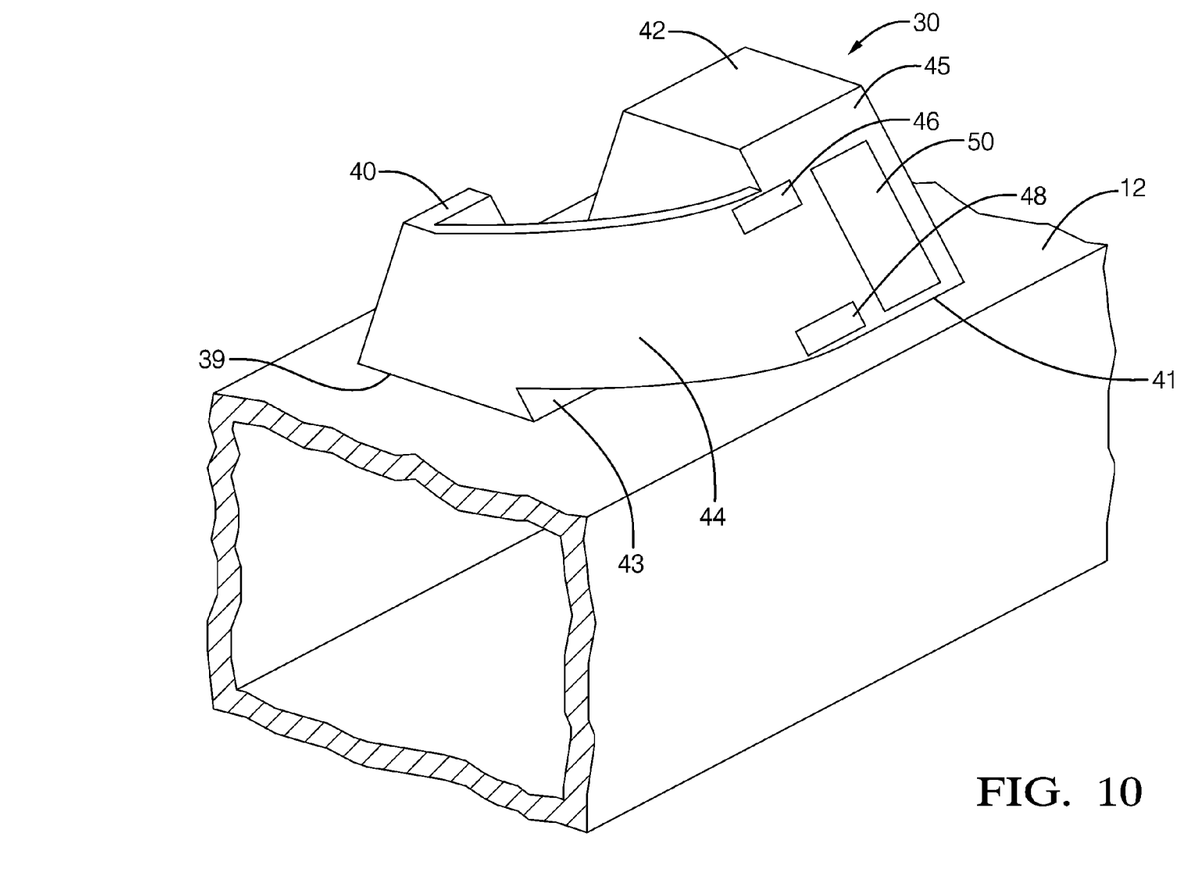
FIG. 10 is a schematic diagram of the stress wave sensor of FIG. 3 with an alternate first contact surface and second contact surface in accordance with another embodiment.

Referring now to FIG. 10, the first non-parallel surface 43 may alternately be adjacent to the first contact surface 39 and the second non-parallel surface 45 may be adjacent to the second contact surface 41, according to an alternate embodiment.

Referring again to FIG. 3, the sensor body 30 may define a third portion 44 of the sensor body 30 disposed between the first non-parallel surface 43 and the second non-parallel surface 45. The third portion 44 may be characterized as an elastic beam. The third portion 44 may be configured to bend or deflect when the first end portion 40 or the second end portion 42 is subjected to a stress wave, thereby inducing stress in the sensor body 30.

A first end of the third portion 44 may be normal to the first non-parallel surface 43 and a second end of the third portion 44 may be parallel to the second non-parallel surface 45. Therefore, the third portion 44 of the sensor body 30 may be arcuate-shaped. Due to the arcuate shape of the third portion 44 between the first non-parallel surface 43 and the second non-parallel surface 45, a first edge of the third portion 44 may be longer than a second edge of the third portion 44. Therefore the stress in the vicinity of the first edge may be different than the stress in the vicinity of the second edge. A person skilled in the art will recognize that the stress exhibited in the sensor body 30 at the first location and the second location may depend on at least the following factors: the distance between the first end portion 40 and the second end portion 42, the size of the first end portion 40 in relation to second end portion 42, the length of third portion 44, the width of third portion 44, the curvature of third portion 44, the thickness of third portion 44, the flexibility of third portion 44, and the angle of inclination of the third portion 44 in relation to the first non-parallel surface 43 and the second non-parallel surface 45 which may or may not be the same.

The first end portion 40, the second end portion 42, and the third portion 44 may be constructed from an identical material. In a non-limiting example, the first end portion 40, the second end portion 42, and the third portion 44 may be constructed from a metal alloy material, ceramic material, or polymeric material. Alternately, the first end portion 40, the second end portion 42, and the third portion 44 may be constructed from different materials. The material used to construct the third portion 44 may be more flexible than the material or materials used to construct the first end portion 40 and the second end portion 42.

Continuing to refer to FIG. 3, the stress wave sensor 20 may further include a microprocessor 50. The microprocessor 50 may receive the first signal from the first strain sensing device 46 and the second signal from the second strain sensing device 48. The microprocessor 50 may be configured to generate a third signal indicative of a vehicle collision event when at least one of the first signal and the second signal exceeds a signal threshold. In a non-limiting example, the signal threshold may be based on the signal amplitude, for example the peak to peak voltage amplitude output from the first strain sensing device 46 or the second strain sensing device 48. Alternately, the signal threshold may be based on a frequency profile indicative of a crash event. The signal threshold may vary depending on the type and configuration of the vehicle 10.

The microprocessor 50 may be disposed within the sensor body 30. The microprocessor 50 may be disposed within a microprocessor cavity defined by the first end portion 40 or the second end portion 42. The microprocessor 50 may alternately be attached to the exterior of the first end portion 40 or the second end portion 42 or may be disposed in other locations.

Figure 11:
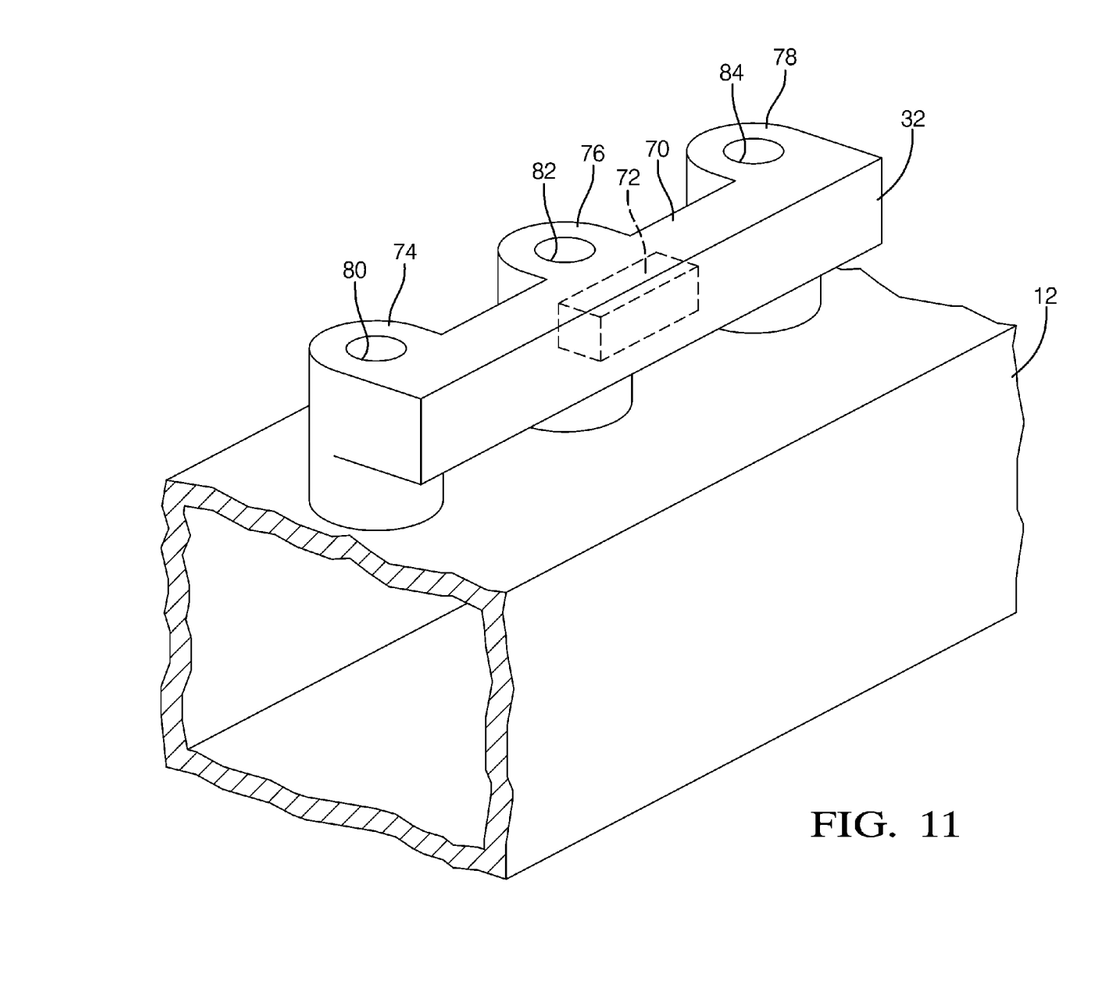
FIG. 11 is a schematic diagram of a housing utilized in the stress wave sensor of FIG. 3 in accordance with another embodiment.

Referring to now to FIG. 11, the stress wave sensor 20 may further include a housing 32 configured to be rigidly coupled to the vehicle frame member 12. The housing 32 defines a cavity 72. The sensor body 30 may be disposed within the cavity 72 and is rigidly coupled to the housing 32, optimally in a location that will experience the greatest deflection when subjected to stress waves. A body portion 70 of the housing 32 may be characterized as a rectangular prism shape. The housing 32 may include a first post portion 74 rigidly coupled to the body portion 70, a second post portion 76 rigidly coupled to the body portion 70, and a third post portion 78 rigidly coupled to the body portion 70. The first post portion 74, the second post portion 76, and the third post portion 78 may be configured to be rigidly coupled to the vehicle frame member 12.

Further, the first post portion 74, the second post portion 76, and the third post portion 78 may be rigidly coupled to a first side of the body portion 70 in a transverse orientation to the longitudinal axis of the body portion 70. The first post portion 74 may define a first aperture 80 extending therethrough. The second post portion 76 may define a second aperture 82 extending therethrough. The third post portion 78 may define a third aperture 84 extending therethrough. In a non-limiting example, the housing 32 may be coupled to the vehicle frame member 12 utilizing threaded bolts that extend through the first aperture 80, the second aperture 82, and the third aperture 84 into corresponding threaded apertures in the vehicle frame member 12.

The second post portion 76 may be located near the lateral midpoint of the body portion 70. The first post portion 74 and the third post portion 78 may be located near the ends of the body portion 70. This may increase the amount of transverse deflection in the body portion 70 due to stress waves propagating through the vehicle frame member 12. In this embodiment of the housing 32, the cavity 72 may advantageously be located near the lateral midpoint so that the sensor body 30 disposed therein experiences increased lateral defection. The first post portion 74, the second post portion 76, and the third post portion 78 may be located on the same side of the body portion 70 to enhance sensitivity to torsional displacement.

The sensor body 30, the body portion 70, the first post portion 74, the second post portion 76, and the third post portion 78 may be constructed from an identical material. In a non-limiting example, the body portion 70 and the first post portion 74, the second post portion 76, and the third post portion 78 can be constructed from a metal alloy material, ceramic material, or polymeric material. Alternately, the sensor body 30, the body portion 70, the first post portion 74, the second post portion 76, and the third post portion 78 may be constructed from different materials.

Referring once more to FIG. 3, an embodiment of the stress wave sensor 20 is provided. The stress wave sensor includes a first end portion 40. The first end portion 40 is characterized as trapezoidal prism shaped. The first end portion 40 further defines a first non-parallel surface 43. The stress wave sensor 20 further includes a second end portion 42. The second end portion 42 is characterized as trapezoidal prism shaped. The second end portion 42 further defines a second non-parallel surface 45. A third portion 44 is coupled between the first non-parallel surface 43 of the first end portion 40 and the second non-parallel surface 45 of the second end portion 42.

The third portion 44 is an arcuate-shaped plate member. The third portion 44 has a third thickness that is less than a first thickness of the first end portion 40 and a second thickness of the second end portion 42 such that the third portion 44 deflects when subjected to or receiving a stress wave. A first strain sensing device 46 is coupled to both the first end portion 40 and the third portion 44. A second strain sensing device 48 is coupled to both the second end portion 42 and the third portion 44.

The first strain sensing device 46 generates a first signal and the second strain sensing device 48 generates a second signal in response to the first strain sensing device 46 and the second strain sensing device 48 detecting a deflection of the third portion 44 due to stress waves propagating through the third portion 44. Additionally, a third strain sensing device 51 and a fourth strain sensing device 53 may be coupled to both the first end portion 40 and the third portion 44. The third strain sensing device 51 and the fourth strain sensing device 53 may each generate a unique signal or may be electrically coupled to the first strain sensing device 46 or the second strain sensing device 48 in a manner to improve stress sensitivity of the first signal and the second signal.

The stress wave sensor 20 may further include a microprocessor 50 receiving the first signal from the first strain sensing device 46 and the second signal from the second strain sensing device 48. The microprocessor 50 may be configured to generate a third signal when at least one of the first signal and the second signal is greater than a threshold amplitude level indicating a vehicle collision event has occurred.

Accordingly a stress wave sensor 20 configured to detect a stress wave caused by a vehicle collision propagating through a vehicle frame member 12 and a housing 32 for the stress wave sensor 20 is provided. The stress wave sensor 20 is capable of detecting both transverse and torsional components of the stress wave. When a microprocessor 50 is included, the stress wave sensor 20 can determine if the stress waves detected are indicative of a vehicle collision and send a signal to an airbag deployment module or other vehicle safety system indicating a vehicle collision has occurred. The response time of the stress wave sensor 20 is faster than acceleration-based or pressure-based sensor types. In one embodiment, the stress wave sensor 20 may have a response time of 3 to 4 milliseconds.

While embodiments of the invention are described with reference to the embodiments, it will be understood by those skilled in the art that various changes may be made and equivalents may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling within the scope of the intended claims. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A sensor configured to detect a stress wave propagating through a vehicle frame member, comprising:

a sensor body configured to be rigidly coupled to the vehicle frame member at a first contact surface and a second contact surface separated from the first contact surface;

a first strain sensing device attached to the sensor body at a first location on the sensor body in a manner effective to detect stress in the sensor body at the first location; and a second strain sensing device attached to the sensor body at a second location on the sensor body in a manner effective to detect stress in the sensor body at the second location, wherein said second location is distinct from the first location, wherein said sensor body is configured to exhibit stress at the first location and at the second location in response to the stress wave propagating along the vehicle frame member, whereby the first strain sensing device generates a first signal indicative of stress in the sensor body at the first location and the second strain sensing device generates a second signal indicative of stress in the sensor body at the second location, wherein the first contact surface is defined by a first end portion of the sensor body characterized as trapezoidal prism shaped that further defines a first non-parallel surface characterized as not parallel to the first contact surface, and the second contact surface is defined by a second end portion of the sensor body characterized as trapezoidal prism shaped that further defines a second non-parallel surface characterized as not parallel to the second contact surface.

2. The sensor of claim 1, wherein the first non-parallel surface and the second non-parallel surface are noncoplanar.

3. The sensor of claim 1, wherein the sensor body defines a third portion of the sensor body disposed between the first non-parallel surface and the second non-parallel surface and characterized as an elastic beam, wherein the third portion is arcuate-shaped.

4. The sensor of claim 1, wherein the first non-parallel surface is opposite the first contact surface and the second non-parallel surface is opposite the second contact surface.

5. The sensor of claim 1, further comprising a microprocessor receiving the first signal and the second signal, wherein the microprocessor is configured to generate a third signal indicative of a vehicle collision event when at least one of the first signal and the second signal exceeds a signal threshold.

6. The sensor of claim 5, wherein the microprocessor is disposed within the sensor body.

7. The sensor of claim 1, further comprising a housing configured to be rigidly coupled to the vehicle frame member, wherein the housing defines a cavity therein, wherein the sensor body is disposed within the cavity and is rigidly coupled to the housing.

8. The sensor of claim 7, wherein a body portion of the housing is characterized as a rectangular prism shape.

9. The sensor of claim 8, wherein the housing includes a first post portion rigidly coupled to the body portion, a second post portion rigidly coupled to the body portion, and a third post portion rigidly coupled to the body portion, wherein the first post portion, the second post portion, and the third post portion are configured to be rigidly coupled to the vehicle frame member.

10. A stress wave sensor, comprising:

a first end portion, wherein the first end portion is characterized as trapezoidal prism shaped that further defines a first non-parallel surface;

a second end portion, wherein the second end portion is characterized as trapezoidal prism shaped that further defines a second non-parallel surface;

a third portion coupled between the first non-parallel surface of the first end portion and the second non-parallel surface of the second end portion, wherein the third portion is an arcuate-shaped plate member, wherein the third portion has a third thickness less than a first thickness of the first end portion and a second thickness of the second end portion such that the third portion deflects when receiving a stress wave;

a first strain sensing device coupled to both the first end portion and the third portion; and a second strain sensing device coupled to both the first end portion and the third portion, whereby the first strain sensing device and the second strain sensing device generating a first signal and a second signal, respectively, in response to the first strain sensing device and the second strain sensing device detecting a deflection of the third portion due to stress waves propagating through the third portion.

* * * * *